US012047762B2

(12) United States Patent
Havukainen

(10) Patent No.: US 12,047,762 B2
(45) Date of Patent: Jul. 23, 2024

(54) CONTROL ELEMENT

(71) Applicant: Nokia Technologies Oy, Espoo (FI)

(72) Inventor: Kai Havukainen, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 216 days.

(21) Appl. No.: 17/612,623

(22) PCT Filed: May 22, 2020

(86) PCT No.: PCT/EP2020/064256
§ 371 (c)(1),
(2) Date: Nov. 19, 2021

(87) PCT Pub. No.: WO2020/234442
PCT Pub. Date: Nov. 26, 2020

(65) Prior Publication Data
US 2022/0248158 A1 Aug. 4, 2022

(30) Foreign Application Priority Data
May 23, 2019 (EP) .................................. 19176197

(51) Int. Cl.
*H04S 7/00* (2006.01)
*G06F 3/04847* (2022.01)
*G06F 3/16* (2006.01)

(52) U.S. Cl.
CPC .......... *H04S 7/302* (2013.01); *G06F 3/04847* (2013.01); *G06F 3/165* (2013.01); *H04S 2400/11* (2013.01); *H04S 2400/13* (2013.01)

(58) Field of Classification Search
CPC .. H04S 7/302; H04S 2400/11; H04S 2400/13; H04S 7/40; G06F 3/04847; G06F 3/165
See application file for complete search history.

(56) References Cited

U.S. PATENT DOCUMENTS

| 9,247,192 | B2* | 1/2016 | Lee ...................... H04N 23/675 |
| 2010/0123785 | A1* | 5/2010 | Chen .................... H04N 23/611 |
| | | | 382/118 |
| 2012/0210223 | A1* | 8/2012 | Eppolito .................. H04S 7/40 |
| | | | 381/22 |

(Continued)

OTHER PUBLICATIONS

"Steinberg Cubase Pro 9 Recording Software, Professional", Amazon, Retrieved on Nov. 5, 2021, Webpage available at : https://www.amazon.com/Steinberg-Cubase-Recording-Software-Professional/dp/B01NAGPPFI.

(Continued)

*Primary Examiner* — Jason R Kurr
(74) *Attorney, Agent, or Firm* — Harrington & Smith

(57) ABSTRACT

An apparatus, method and computer program product for receiving spatial audio information comprising at least one characteristic parameter, providing, on a user interface, a control element for controlling the at least one characteristic parameter in dependence upon a position of the control element on the user interface, providing on the user interface a first path of the control element and a second path of the control element and modifying the first path of the control element and the second path of the control element according to predefined criteria in response to receiving a user input to change the position of the control element from a first position to a second position on the user interface.

20 Claims, 4 Drawing Sheets

(56) References Cited

U.S. PATENT DOCUMENTS

| | | | |
|---|---|---|---|
| 2015/0281833 A1* | 10/2015 | Shigenaga | H04R 3/005 |
| | | | 381/92 |
| 2016/0299738 A1 | 10/2016 | Makinen et al. | |
| 2018/0314488 A1* | 11/2018 | Hayasaka | G06F 3/04883 |
| 2021/0048976 A1* | 2/2021 | Taguchi | H04R 1/403 |

OTHER PUBLICATIONS

Extended European Search Report received for corresponding European Patent Application No. 19176197.2, dated Dec. 16, 2019, 7 pages.

International Search Report and Written Opinion received for corresponding Patent Cooperation Treaty Application No. PCT/EP2020/064256, dated Aug. 21, 2020, 10 pages.

Office action received for corresponding European Patent Application No. 19176197.2, dated Mar. 17, 2023, 5 pages.

* cited by examiner

CONTROL ELEMENT

RELATED APPLICATION

This application claims priority to PCT Application No. PCT/EP20201064256, filed on May 22, 2020, which claims priority to EP Application No. 19176197.2, filed on May 23, 2019, each of which is incorporated herein by reference in its entirety.

TECHNICAL FIELD

The present application relates generally to providing a control element on a user interface. More specifically, the present application relates to modifying spatial audio information.

BACKGROUND

The amount of multimedia content increases continuously. Users create and consume multimedia content, and it has a big role in modern society.

SUMMARY

Various aspects of examples of the invention are set out in the claims. The scope of protection sought for various embodiments of the invention is set out by the independent claims. The examples and features, if any, described in this specification that do not fall under the scope of the independent claims are to be interpreted as examples useful for understanding various embodiments of the invention.

According to a first aspect of the invention, there is provided an apparatus comprising means for performing: receiving spatial audio information comprising at least one characteristic parameter, providing, on a user interface, a control element for controlling the at least one characteristic parameter in dependence upon a position of the control element on the user interface, providing on the user interface a first path of the control element and a second path of the control element and modifying the first path of the control element and the second path of the control element according to predefined criteria in response to receiving a user input to change the position of the control element from a first position to a second position on the user interface.

According to a second aspect of the invention, there is provided a method comprising: receiving spatial audio information comprising at least one characteristic parameter, providing, on a user interface, a control element for controlling the at least one characteristic parameter in dependence upon a position of the control element on the user interface, providing on the user interface a first path of the control element and a second path of the control element and modifying the first path of the control element and the second path of the control element according to predefined criteria in response to receiving a user input to change the position of the control element from a first position to a second position on the user interface.

According to a third aspect of the invention, there is provided a computer program comprising instructions for causing an apparatus to perform at least the following: receiving spatial audio information comprising at least one characteristic parameter, providing, on a user interface, a control element for controlling the at least one characteristic parameter in dependence upon a position of the control element on the user interface, providing on the user interface a first path of the control element and a second path of the control element and modifying the first path of the control element and the second path of the control element according to predefined criteria in response to receiving a user input to change the position of the control element from a first position to a second position on the user interface.

According to a fourth aspect of the invention, there is provided an apparatus comprising at least one processor and at least one memory including computer program code, the at least one memory and the computer program code configured to with the at least one processor, cause the apparatus at least to perform: receive spatial audio information comprising at least one characteristic parameter, provide, on a user interface, a control element for controlling the at least one characteristic parameter in dependence upon a position of the control element on the user interface, provide on the user interface a first path of the control element and a second path of the control element and modify the first path of the control element and the second path of the control element according to predefined criteria in response to receiving a user input to change the position of the control element from a first position to a second position on the user interface.

According to a fifth aspect of the invention, there is provided a non-transitory computer readable medium comprising program instructions for causing an apparatus to perform at least the following: receiving spatial audio information comprising at least one characteristic parameter, providing, on a user interface, a control element for controlling the at least one characteristic parameter in dependence upon a position of the control element on the user interface, providing on the user interface a first path of the control element and a second path of the control element and modifying the first path of the control element and the second path of the control element according to predefined criteria in response to receiving a user input to change the position of the control element from a first position to a second position on the user interface According to a sixth aspect of the invention, there is provided a computer readable medium comprising program instructions for causing an apparatus to perform at least the following: receiving spatial audio information comprising at least one characteristic parameter, providing, on a user interface, a control element for controlling the at least one characteristic parameter in dependence upon a position of the control element on the user interface, providing on the user interface a first path of the control element and a second path of the control element and modifying the first path of the control element and the second path of the control element according to predefined criteria in response to receiving a user input to change the position of the control element from a first position to a second position on the user interface.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1:
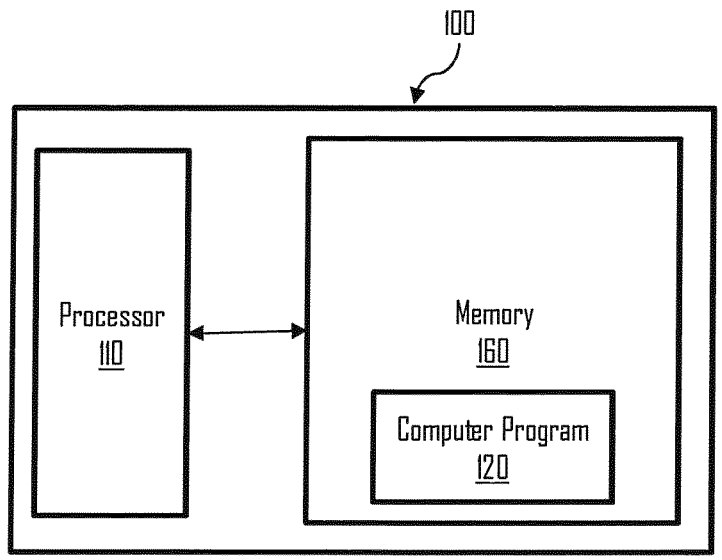
FIG. 1 shows a block diagram of an example apparatus in which examples of the disclosed embodiments may be applied.

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Example embodiments relate to capturing and/or modifying at least one characteristic parameter comprised by captured content. Captured content may be stored in volatile or non-volatile memory. For example, when the content has been captured it may be saved to a file on a capturing device or to a file located on a cloud service. When playing back the captured content the saved file may be downloaded to a playback device and opened. The captured content may also be edited on the capturing and/or playback device. Storing captured content may comprise storing the captured content in one or more files. Captured content may comprise spatial audio information and/or captured visual information.

Spatial audio may comprise a full sphere surround-sound to mimic the way people perceive audio in real life. Spatial audio may comprise audio that appears from a user's position to be assigned to a certain direction and/or distance. Spatial audio may comprise audio created by sound sources, ambient audio or a combination thereof. Ambient audio may comprise audio that might not be identifiable in terms of a sound source such as traffic humming, wind or waves, for example. Therefore, the perceived audio may change with the movement of the user or with the user turning. The full sphere surround-sound may comprise a spatial audio field and the position of the user or the position of the capturing device may be considered as a reference point in the spatial audio filed. According to an example embodiment, a reference point comprises the centre of the audio field.

Spatial audio may be captured with, for example, a capturing device comprising a plurality of microphones configured to capture audio signals around the capturing device. In addition to capturing audio signals, the capturing device may also be configured to capture different characteristic parameters relating to the captured audio signals. The captured characteristic parameters may be stored with the captured audio or in a separate file. A capturing device may be, for example, a camera, a video recorder or a smartphone.

Spatial audio may comprise one or more characteristic parameters such as an audio focus parameter and/or an audio zoom parameter. A characteristic parameter may comprise a characteristic parameter value with respect to a reference point such as the position of the user or the position of the capturing device.

An audio focus feature allows a user to focus on audio in a desired direction when capturing content. Therefore, an audio focus feature also allows a user to at least partially eliminate background noises. When capturing content, in addition to capturing audio, also the direction of sound is captured. A direction of sound may be defined with respect to a reference point. For example, a direction of sound may comprise an angle with respect to a reference point or a discrete direction such as front, back, left, right, up and/or down with respect to a reference point, or a combination thereof. An audio focus characteristic parameter may also comprise one or more further levels of detail such as horizontal focus direction and/or vertical focus direction.

An audio zoom feature allows a user to zoom in on a sound. Zooming in on a sound comprises adjusting an amount of audio gain associated with a particular direction. Therefore, an audio zoom parameter corresponds to sensitivity to a direction of sound. Audio zoom may be performed using audio beamforming with which a user may be able to control, for example, the size, shape and/or direction of the audio beam. Performing audio zooming may comprise controlling audio signals coming from a particular direction while attenuating audio signals coming from other directions. For example, an audio zoom feature may allow controlling audio gain. Audio gain may comprise an amount of gain set to audio input signals coming from a certain direction. An audio zoom parameter value may be defined with respect to a reference point. For example, an audio zoom parameter may be a percentage value and the reference point may correspond to, for example, a value of 0% in which case, at the reference point, the audio comprises surround sound with no audio zooming. As another example, an audio zoom feature may allow delaying different microphone signals differently and then summing the signals up, thereby enabling spatial filtering of audio.

Audio zooming may be associated with zooming visual information. For example, if a user records a video and zooms in on an object, the audio may also be zoomed in on the object such that, for example, sound generated by the object is emphasized and other sounds are attenuated. In other words, spatial audio parameters may be controlled by controlling the video zoom.

Captured content may be modified using the capturing device or a different device configured to receive the captured content. Modifying captured content may comprise activating an editing mode in which the captured content is modified in response to user inputs.

In response to a user input, the apparatus is configured to modify the captured content. The apparatus may also be configured to store the modified content. Modifying the captured content may be performed using a control element provided on a user interface. Example embodiments further relate to providing a first path of the control element and a second path of the control element on the user interface. The first path of the control element and the second path of the control element may comprise one or more representations of previous positions and future positions, respectively, of the control element on the user interface. A representation of a previous/future position of a control element may comprise a visual representation, a haptic/tactile representation or a combination thereof. Example embodiments further relate to modifying the first path of the control element and the second path of the control element in response receiving a user input to change the position of the control element on the user interface.

According to an example embodiment, an apparatus is configured to receive spatial audio information comprising at least one characteristic parameter. The at least one characteristic parameter may comprise, for example, an audio focus parameter corresponding to a direction of audio with respect to a reference point and/or an audio zoom parameter corresponding to an amount of audio gain to the direction of audio focus. The apparatus is configured to provide a control element on a user interface for controlling the at least one characteristic parameter in dependence upon a position of the control element on the user interface. The apparatus is further configured to provide a first path of the control element and a second path of the control element on the user interface. The first path may comprise one or more previous positions of the control element on the user interface and the second path may comprise one or more future positions on the user interface. The apparatus is further configured to modify the first path of the control element and the second path of the control element according to predefined criteria in response to receiving a user input to change the control element from a first position to a second position on the user interface.

FIG. 1 is a block diagram depicting an apparatus 100 operating in accordance with an example embodiment of the invention. The apparatus 100 may be, for example, an electronic device such as a chip or a chip-set. The apparatus 100 includes a processor 110 and a memory 160. In other examples, the apparatus 100 may comprise multiple processors.

In the example of FIG. 1, the processor 110 is a control unit operatively connected to read from and write to the memory 160. The processor 110 may also be configured to receive control signals received via an input interface and/or the processor 110 may be configured to output control signals via an output interface. In an example embodiment the processor 110 may be configured to convert the received control signals into appropriate commands for controlling functionalities of the apparatus.

The memory 160 stores computer program instructions 120 which when loaded into the processor 110 control the operation of the apparatus 100 as explained below. In other examples, the apparatus 100 may comprise more than one memory 160 or different kinds of storage devices.

Computer program instructions 120 for enabling implementations of example embodiments of the invention or a part of such computer program instructions may be loaded onto the apparatus 100 by the manufacturer of the apparatus 100, by a user of the apparatus 100, or by the apparatus 100 itself based on a download program, or the instructions can be pushed to the apparatus 100 by an external device. The computer program instructions may arrive at the apparatus 100 via an electromagnetic carrier signal or be copied from a physical entity such as a computer program product, a memory device or a record medium such as a Compact Disc (CD), a Compact Disc Read-Only Memory (CD-ROM), a Digital Versatile Disk (DVD) or a Blu-ray disk.

Figure 2:
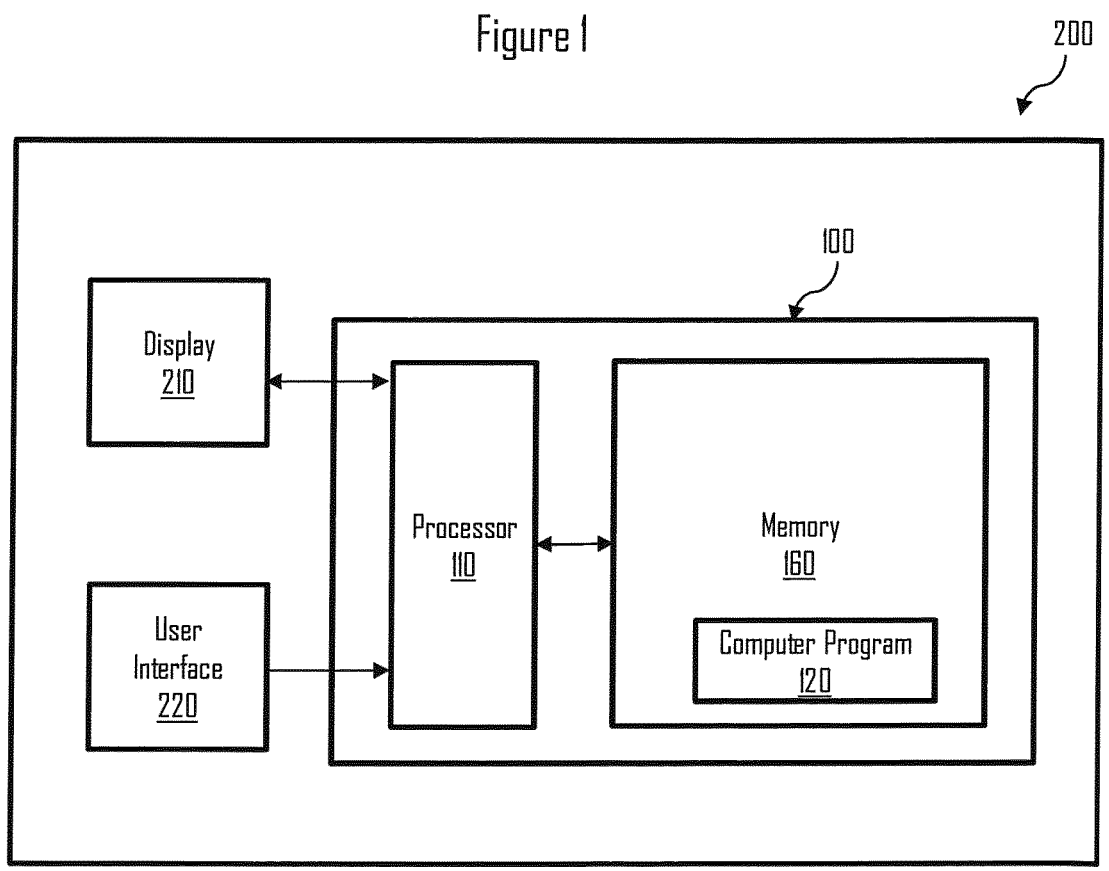
FIG. 2 shows a block diagram of another example apparatus in which examples of the disclosed embodiments may be applied.

FIG. 2 is a block diagram depicting an apparatus 200 in accordance with an example embodiment of the invention. The apparatus 200 may be an electronic device such as a hand-portable device, a mobile phone or a Personal Digital Assistant (PDA), a Personal Computer (PC), a laptop, a desktop, a tablet computer, a wireless terminal, a communication terminal, a game console, a music player, an electronic book reader (e-book reader), a positioning device, a digital camera, a household appliance, a CD-, DVD or Blu-ray player, or a media player. In the examples below it is assumed that the apparatus 200 is a mobile computing device.

In the example embodiment of FIG. 2, the mobile computing device 200 is illustrated as comprising the apparatus 100, a display 210 and a user interface 220 for interacting with the mobile computing device 200. The display 210 may also be configured to act as a user interface. For example, the display may be a touch screen display. In an example embodiment, the display 210 and/or the user interface 220 may be external to the apparatus 200, but in communication with it.

Additionally or alternatively, the user interface may also comprise a manually operable control such as a button, a key, a touch pad, a joystick, a stylus, a pen, a roller, a rocker, a keypad, a keyboard or any suitable input mechanism for inputting and/or accessing information. Further examples include a microphone, a camera, a speech recognition system, eye movement recognition system, acceleration-, tilt- and/or movement-based input systems. Therefore, the mobile computing device 200 may also comprise different kinds of sensors such as one or more gyro sensors, accelerometers, magnetometers, position sensors and/or tilt sensors.

The mobile computing device 200 of the example of FIG. 2 may also be configured to establish radio communication with another device using, for example, a Bluetooth, WiFi, radio frequency identification (RFID), or a near field communication (NFC) connection.

According to an example embodiment, the apparatus 200 is configured to receive spatial audio information comprising at least one characteristic parameter. The apparatus 200 may be configured to receive spatial audio information, for example, by receiving a file from a separate device, by opening a file comprised by the apparatus 200 or by receiving spatial audio information as streamed content. According to an example embodiment, spatial audio information comprises captured spatial audio. The captured spatial audio may be stored on the apparatus 200 or may be received from a separate apparatus.

The at least one characteristic parameter may comprise one or more spatial audio parameters. A spatial audio parameter may comprise a parameter for controlling a particular spatial audio feature. A spatial audio parameter may comprise a parameter that is defined with respect to a reference point. For example, a spatial audio parameter may comprise the direction of audio that is interesting to the user and the amount of audio gain towards that direction. Different characteristic parameters comprised by spatial audio may have a common reference point.

A characteristic parameter may comprise a parameter for controlling a characteristic of spatial audio. A characteristic may comprise, for example, volume, an amount of effect or panning in 3D space.

According to an example embodiment, the at least one characteristic parameter comprises an audio focus parameter corresponding to a direction of audio with respect to a reference point. For example, a user may perceive that audio is located to the left or to the right of the user. A direction of audio may comprise a direction with respect to a reference point such as left, right, front, back, up, down or any combination thereof. A direction may also comprise a hearing angle with respect to the reference point such as 30°, 80°, 120° or 240° or any other angle between 0° and 360°.

According to another example embodiment, the at least one characteristic parameter comprises an audio zoom parameter corresponding to an amount of audio gain with respect to a reference point. For example, a user may zoom in on audio in a particular direction such that audio signals from the particular direction are emphasized and audio signals from other directions are attenuated. Audio gain may comprise a value with respect to a reference point such as a gain of 10%, 50%, 80% or any other gain between 0% and 100%. At the reference point audio gain may be 0% and, in that case, there is no audio zooming to any direction, but audio comprises surround audio.

According to a further example embodiment, the at least one characteristic parameter comprises an audio focus parameter and an audio zoom parameter.

Characteristic parameters may be included in spatial audio information in different ways. For example, a characteristic parameter may be included in spatial audio information when capturing the spatial audio information or after capturing the spatial audio information. Including a characteristic parameter in spatial audio information when capturing the spatial audio information may comprise, for example, manually adjusting the characteristic parameter or applying automatic sound source tracking techniques such as visual object tracking or audio-based sound source tracking. Including characteristic parameters in spatial audio information after capturing the spatial audio information may comprise, for example, editing characteristic parameters by an editing tool or editing characteristic parameters by applying automatic sound source tracking techniques such as visual object tracking or audio-based sound source tracking techniques.

According to an example embodiment, the apparatus 200 is further configured to provide, on a user interface, a control element for controlling the at least one characteristic parameter in dependence upon a position of the control element on the user interface. According to an example embodiment, a position of the control element at a particular time instant corresponds to at least one characteristic parameter value at the particular time instant in captured content. The at least one characteristic parameter value may be indicated to a user, for example, visually, audibly, using haptic feedback, using tactile feedback or any combination thereof.

The user interface may be provided on, for example, a touch screen, a tactile-audio display or a combination thereof. A user interface may comprise a graphical user interface, a graphical user interface with haptic and/or tactile feedback, or a user interface configured to present user interface elements non-visually. The user interface may also comprise a haptic and/or tactile input/output area that is connected to a separate display.

According to an example embodiment, the user interface comprises a representation of a spatial audio field with respect to a reference point. A representation of a spatial audio field may comprise a visual, tactile and/or haptic representation of a reference point and a visual, tactile and/or haptic indication of one or more dimensions with respect to the reference point. According to an example embodiment, the reference point corresponds to a position of the user. According to another example embodiment, the reference point corresponds to a position of the capturing device when capturing the spatial audio information. According to a further example embodiment, the reference point corresponds to the centre point of the spatial audio field.

The apparatus 200 may be configured to determine a spatial audio field based on one or more characteristics of received spatial audio information and provide a representation of the spatial audio field according to the characteristics of the received spatial audio information. Determining a spatial audio field may comprise detecting one or more characteristic parameters in the received spatial audio information. The apparatus 200 may also be configured to update the representation of the spatial audio field in response to a detected change in one or more characteristic parameters.

The control element may be configured to control one or more characteristic parameters. For example, the control element may be configured to control an audio focus parameter, an audio zoom parameter, or both an audio focus parameter and an audio zoom parameter. The control element may be configured to control an audio focus parameter and an audio zoom parameter concurrently.

The control element may be a graphical object provided on the user interface, an object configured to provide haptic/tactile feedback or any combination thereof. The control element may have different geometrical shapes. For example, the control element may be a circle, a triangle, a square, an ellipse, a 3D shape or any combination thereof. According to an example embodiment, the apparatus 200 is configured to change the position of the control element on the user interface in response to a user input. According to another example embodiment, the apparatus 200 is configured to automatically change the position of the control element on the user interface during playback or recording of the spatial audio information.

According to an example embodiment, a position of the control element on the user interface corresponds to a characteristic parameter value of the at least one characteristics parameter. For example, in a first position of the control element on a user interface, a characteristic parameter may have a first value and in a second position of the control element on the user interface, the characteristic parameter may have a second value. In other words, the apparatus 200 may be configured to present a value of a characteristic parameter by a position of the control element on the user interface. As another example, in a first position of the control element on a user interface a first characteristic parameter may have a first value and a second characteristic parameter may have a first value and in a second position of the control element on the user interface, the first characteristic parameter may have a second value and the second characteristic parameter may have a second value. In other words, the apparatus 200 may be configured to present, using a single control element, characteristic parameter values of two different characteristic parameters. The control element may be configured to present a characteristic parameter value visually, audibly, using haptic feedback, using tactile feedback or any combination thereof.

The apparatus 200 may be configured to present the position of the control element on the user interface when capturing the spatial audio information and/or during playback of captured content.

In addition to presenting a value of a characteristic parameter on a user interface, the control element may be used for modifying a value of at least one characteristic parameter. Modifying a value of at least one characteristic parameter value may also comprise other modifications of captured content. For example, a user may modify the playback speed to make it easier to modify the at least one characteristic parameter value. Modifying other parameters may also cause the apparatus 200 to modify the at least one characteristic parameter.

According to an example embodiment, the apparatus 200 is configured to modify a corresponding characteristic parameter in response to changing a position of the control element on the user interface. Modifying a characteristic parameter may comprise modifying a characteristic parameter value. According to an example embodiment, the apparatus 200 is configured to modify a value of a characteristic parameter from a first value to a second value in response to receiving an indication of a user input to change the position of the control element from a first position to a second position. The apparatus 200 may be configured to determine the second value of a characteristic parameter based on the second position of the control element with respect to a reference point or based on a difference between the first position and the second position of the control element. According to another example embodiment, the apparatus 200 is configured to modify a value of a first characteristic parameter from a first value to a second value and a value of a second characteristic parameter from a first value to a second value in response to receiving an indication of a user input to change the position of the control element from a first position to a second position.

Without limiting the scope of the claims, an advantage of providing a control element for controlling at least one characteristic parameter comprised by spatial audio information in dependence upon a position of the control element on a user interface is that with a single control element, multiple parameters of spatial audio may be controlled at the same time.

According to an example embodiment, the apparatus 200 is configured to provide on the user interface a first path of the control element and a second path of the control element. A path of a control element may comprise one or more positions of the control element on the user interface at different time instances. For example, a path may comprise a presentation of one or more previous positions or one more of future position of the control element with respect to a current position of the control element. The apparatus 200 may be configured to present at least the first path on the user interface when capturing the spatial audio information and/or present the first path and the second path during playback of captured content. In some example embodiments, the apparatus 200 may be configured to also present the second path when capturing the spatial audio information. For example, if there is an object tracked in a viewfinder of a camera and the audio is focused on the object, the apparatus 200 may be able to predict the second path.

One or more positions of the control element may comprise one or more consecutive positions of the control element on the user interface. In other words, a path may comprise a presentation of past/future positions of a control element on a user interface. A first path and a second path may be different paths or different portions of a single path.

Different time instances may comprise time instances at regular time intervals or time instances complying with one or more criterion. A criterion may be, for example, a change in a characteristic parameter value. For example, a path may comprise one or more positions of the control element at each second or a path may comprise one or more positions of the control element at time instances when there is a change in a characteristic parameter value.

A length of the path may be limited based on one or more criterion. A criterion may be, for example, time interval from the position of the control element. For example, the apparatus 200 may be configured to provide the first path and/or the second path such that, for example, the duration of the path is 3 seconds, 5 seconds or any other suitable length. Another criterion may be, for example, a number of control element positions. For example, the apparatus 200 may be configured to provide the first path and/or the second path such that the path comprises 3, 5 or any suitable number positions of the control element. A length of the path may depend upon the size of the user interface.

Without limiting the scope of the claims, limiting a length of a path may have an advantage that the user interface may be kept clearer, especially if the user interface has limited screen area.

According to an example embodiment, the first path comprises one or more previous positions of the control element on the user interface. A previous position of the control element on the user interface may comprise a position of the control element before a current position.

According to an example embodiment, the second path comprises one or more future positions of the control element on the user interface. A future position of the control element on the user interface may comprise a position of the control element following a current position.

According to an example embodiment, the apparatus 200 is configured to differentiate the first path from the second path. The apparatus 200 may be configured to differentiate the first path from the second path visually such as by providing the first path and the second path in different colours, by providing the positions of the control element in different geometrical shapes and/or in different sizes. The apparatus 200 may also be configured to differentiate the first path from the second path by providing haptic/tactile feedback such as providing different feedback on the first path and the second path. Differentiating the first path from the second path using haptic/tactile feedback may comprise different feedback patterns, different intensities and/or different feedback frequencies for the first path and the second path. The apparatus 200 may be configured to provide the control element on the user interface as a boundary between the first path and the second path.

According to an example embodiment, the apparatus 200 is configured to modify a presentation of the control element in dependence upon a future position of the control element comprised by the second path. For example, the apparatus 200 may be configured to inform the user that there are no further future positions of the control element. The apparatus 200 may be configured to inform a user by modifying the visual appearance of the control element, for example, by modifying a size, shape and/or colour of the control element. The apparatus 200 may also be configured to inform a user by modifying haptic/tactile feedback provided by the control element such as by modifying haptic/tactile feedback in terms of intensity, a feedback pattern and/or frequency.

Without limiting the scope of the claims, an advantage of modifying a presentation of the control element and/or haptic/tactile feedback provided by the control element in dependence upon a future position of the control element comprised by the second path may be that a user is informed of any upcoming positions of the control element, even if the length of the path is limited and the second path does not seem to indicate any future positions.

According to an example embodiment, the apparatus 200 is configured to modify the first path of the control element and the second path of the control element according to predefined criteria in response to receiving a user input to change the position of the control element from a first position to a second position on the user interface.

In other words, changing the position of the control element from a first position to a second position may affect one or more previous and future positions of the control element. Modifying the first path of the control element may comprise modifying one or more positions of the control element on the first path. Modifying the second path of the control element may comprise modifying one or more positions of the control element on the second path. A number of modified positions of the control element on the first path and the second path may depend upon the predefined criteria.

The predefined criteria may comprise one or more characteristics relating to changing the position of the control element from the first position to a second position. According to an example embodiment, the predefined criteria comprises a distance between the first position and the second position. According to another example embodiment, the predefined criteria comprises a change in a characteristic parameter value caused by changing the control element from the first position to a second position.

According to an example embodiment, the apparatus 200 is configured to modify at least one previous position of the control element on the first path in dependence upon changing the control element from the first position to a second position. The apparatus 200 may be configured to determine a number of previous positions of the control element to be modified based on a distance between the first position of the control element and the second position of the control element. For example, if the distance between the first position and the second position of the control element is above a threshold value, a first number of positions of the control element on the first path is modified. If the distance between the first position of the control element and the second position of the control element is below a threshold value, a second number of positions of the control element on the first path is modified.

Additionally or alternatively, the apparatus 200 may be configured to determine a number of previous positions of the control element to be modified based on a change in a characteristic parameter value corresponding to the change from the first position to the second position. For example, if the change in a characteristic parameter value is above a threshold value, a first number of positions of the control element on the first path is modified. If the change in a characteristic parameter value is below a threshold value, a second number of positions of the control element on the first path is modified.

According to another example embodiment, the apparatus 200 is configured to modify at least one future position of the control element on the second path in dependence upon changing the control element from the first position to a second position. The apparatus 200 may be configured to determine a number of future positions of the control element to be modified based on a distance between the first position of the control element and the second position of the control element. For example, if the distance between the first position and the second position of the control element is above a threshold value, a first number of positions of the control element on the second path is modified. If the distance between the first position of the control element and the second position of the control element is below a threshold value, a second number of positions of the control element on the second path is modified.

Additionally or alternatively, the apparatus 200 may be configured to determine a number of future positions of the control element to be modified based on a change in a characteristic parameter value corresponding to the change from the first position to the second position. For example, if the change in a characteristic parameter value is above a threshold value, a first number of positions of the control element on the second path is modified. If the change in a characteristic parameter value is below a threshold value, a second number of positions of the control element on the second path is modified.

According to a further example embodiment, the apparatus 200 is configured to modify at least one previous position of the control element and at least one future position of the control element in dependence upon changing the control element from the first position to a second position. In other words, changing the position of the control element from a first position to a second position may affect one or more previous and future positions of the control element.

Therefore, a path may comprise a plurality of previous/future positions of the control element that are connected such that modifying one position may cause modifying one or more other positions.

Without limiting the scope of the claims, an advantage of modifying the first path of the control element and the second path of the control element in response to receiving a user input may be that sudden changes in the characteristic parameter values may be reduced.

According to an example embodiment, the apparatus 200 is configured to receive audio and visual information. Assuming the apparatus 200 is a mobile computing device comprising one or more microphones and one or more cameras, audio information may be captured by the one or more microphones and visual information may be captured by the one or more cameras. The apparatus 200 may also be configured to receive captured audio and/or visual information from one or more separate devices and present the captured audio and visual information during playback. The apparatus 200 may also be configured to modify the captured audio and/or visual information and present the modified audio and/or visual information. The apparatus 200 may be configured to operate in a plurality of modes. For example, the apparatus 200 may be configured to operate in a first mode and a second mode. The first mode may comprise a capturing mode in which the apparatus 200 is configured to capture audio and/or visual information and the second mode may comprise an editing mode in which the apparatus 200 is configured to modify captured audio and/or visual information. The first mode and the second mode may be activated in response to a user input.

According to an example embodiment, the apparatus 200 is configured to adjust one or more spatial audio characteristic parameters concurrently with capturing audio and/or visual information. The apparatus 200 may be configured to receive an indication of a selected area or a position on a user interface and adjust one or more characteristic parameters based on the received indication. Adjusting one or more characteristic parameters based on a selected area or a position may comprise adjusting the characteristic parameter values such that characteristic parameter values are adjusted towards the direction of the selected area/position.

According to an example embodiment, the apparatus 200 comprises means for performing the features of the claimed invention, wherein the means for performing comprises at least one processor 110, at least one memory 160 including computer program code 120, the at least one memory 160 and the computer program code 120 configured to, with the at least one processor 110, cause the performance of the apparatus 200. The means for performing the features of the claimed invention may comprise means for receiving spatial information, means for providing a control element on a user interface, means for providing a first path of the control element and a second path of the control element on the user interface and means for modifying the first path of the control element and the second path of the control element. The means for performing the features of the claimed invention may further comprise means for differentiating the first path from the second path, means for modifying at least one previous position of the control element, means for modifying at least one future position of the control element, means for modifying presentation of the control element and means for modifying a characteristic parameter.

Figure 3:
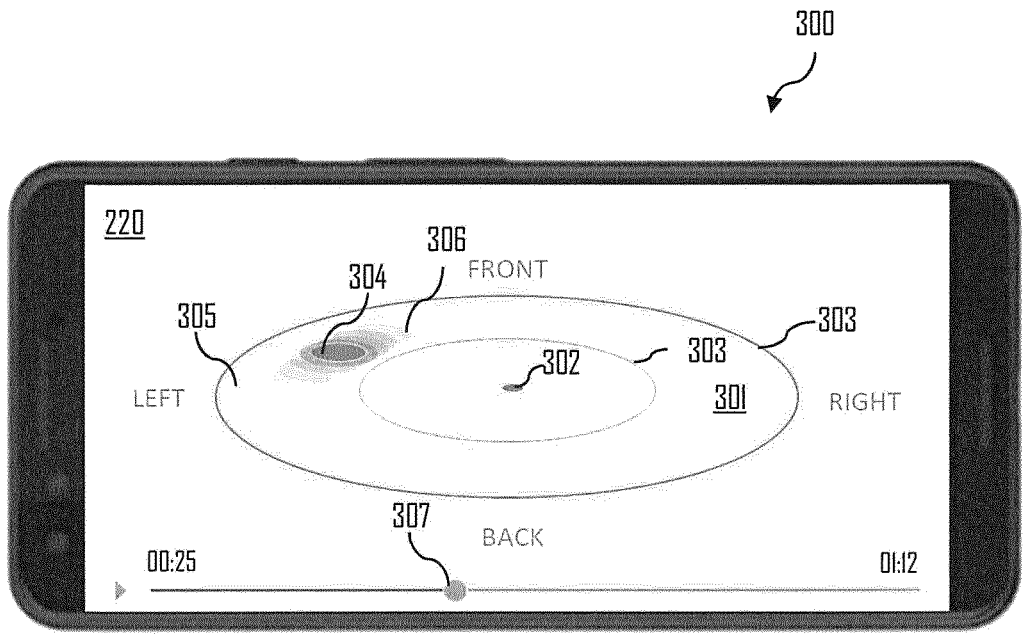
FIG. 3 illustrates an example user interface.

FIG. 3 illustrates an example user interface for modifying captured content such as captured audio. In the example of FIG. 3, the apparatus is a mobile computing device 300 comprising a touch screen. The mobile computing device 300 comprises a user interface 220. The user interface 220 is a touch screen configured to enable editing audio information comprising two characteristic parameters. The audio information may comprise, for example, spatial audio information.

In the example of FIG. 3 the spatial audio information comprises a recording of audio content that has a duration of 1:12. FIG. 3 illustrates the situation at moment 00:25. In the example of FIG. 3 the two characteristic parameters comprise audio focus and audio zoom. An audio focus value comprises a direction with respect to a reference point 302. For example, an audio focus value may comprise FRONT, RIGHT, BACK, LEFT, UP, DOWN or a combination thereof. An audio zoom value comprises an amount of audio gain with respect to the reference point 302. For example, an audio zoom value may comprise audio gain of 0 . . . 100% with respect to the reference point such that at the reference point the audio zoom value is 0% and hence, there is no audio zooming to any direction. In other words, at the reference point audio comprises surround audio.

The user interface 220 comprises a representation of a spatial audio field 301. The representation of the spatial audio field 301 comprises the reference point 302 and indications of different directions with respect to the reference point 302. In the example of FIG. 3, the indications of different directions with respect to the reference point 302 comprise FRONT, RIGHT, BACK and LEFT. The representation of spatial audio field 301 further comprises indications of audio zoom values. A representation of audio field 301 may comprise any suitable number of indications of audio zoom values. In the example of FIG. 3, an indication of an audio zoom value comprises a curve 303 around the reference point 302. The curve 303 closer to the reference point 302 may represent a value of 50% of audio zoom and the utmost curve 303 may represent a value of 100% of audio zoom from the reference point 302. As mentioned above, at the reference point, the audio zoom value is 0%.

The representation of the spatial audio field 301 further comprises a control element 304 for controlling the two characteristic parameters. The position of the control element 304 corresponds to an audio zoom value and an audio focus value at the moment 00:25. At the moment 00:25, the position of the control element 304 corresponds to an audio focus value between LEFT and FRONT, and an audio zoom value at about 75%.

The representation of the spatial audio field 301 further comprises a first path 305 of the control element 304 and a second path 306 of the control element. The first path 305 may represent previous positions of the control element in captured content and the second path may represent future positions of the control element in the captured content. A position of the control element 304 corresponds to captured audio at a given moment. For example, in FIG. 3, the position of the control element 304 corresponds to captured audio at moment 00:25. If the user seeks forward, for example, by dragging the circle 307 on the timeline towards the end time 01:12, the control element 304 is moved accordingly to illustrate the corresponding captured audio at each moment. If the user seeks backward, for example, by dragging the circle 307 on the timeline towards the start time, the control element 304 is moved accordingly to illustrate the corresponding captured audio at each moment. Moving the control element 304 also causes updating the first path 305 and the second path 306. In other words, the control element 304 is associated with captured audio at a given point in time, the first path 305 comprises positions of the control element 304 before the given point in time and the second path 306 comprises positions of the control element 304 after the given point in time. Therefore, the position of the control element 304 is associated with a corresponding playback position.

As discussed above, the first path 305 of the control element 304 comprises previous positions of the control element 304 at a certain time instance corresponding to the time instance of the captured content. In other words, the first path 305 of the control element 304 comprises positions of the control element 304 that occurred before the moment 00:25. The second path of 306 of the control element 304 comprises future positions of the control element 304. In other words, the second path 306 of the control element 304 comprises positions of the control element 304 that occur after the moment 00:25.

Figure 4:
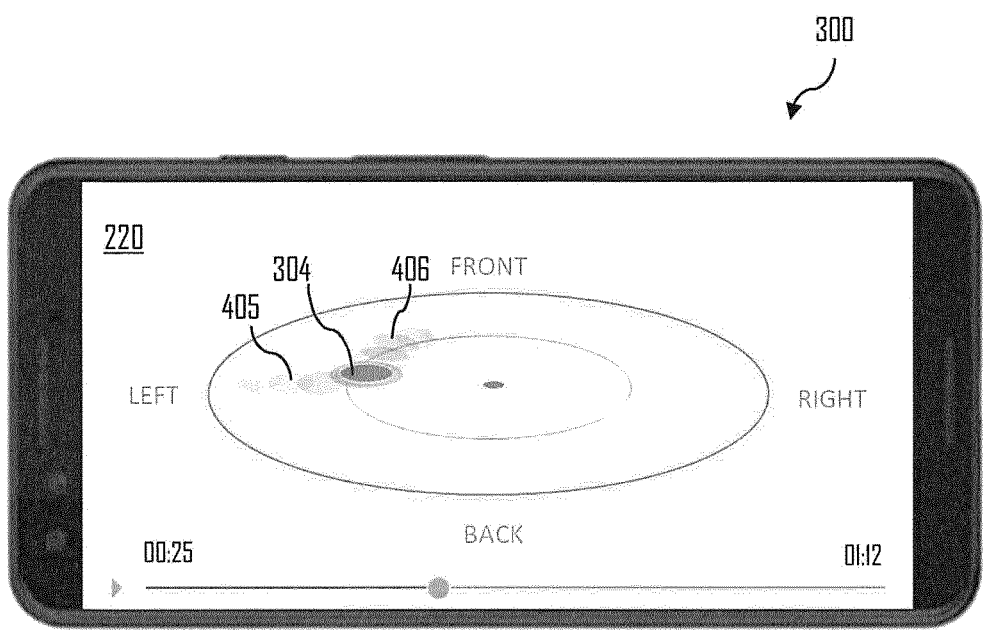
FIG. 4 illustrates an example of changing a position of a control element.

FIG. 4 illustrates modifying captured content by changing the position of the control element on a user interface. In the example of FIG. 3, the control element 304 is in a first position at moment 00:25. In the example of FIG. 4, the control element 304 is in a second position at the same moment 00:25. In other words, the control element 304 has been changed from a first position to a second position. As a consequence, the audio focus value remains about the same as in FIG. 3, but the audio zoom value has changed from about 75% to about 45%. As illustrated in FIG. 4, also the first path 405 and the second path 406 of the control element have changed. In other words, in addition to modifying the audio zoom and audio focus values at the moment 00:25, also previous and future values of the control element are changed.

Figure 5:
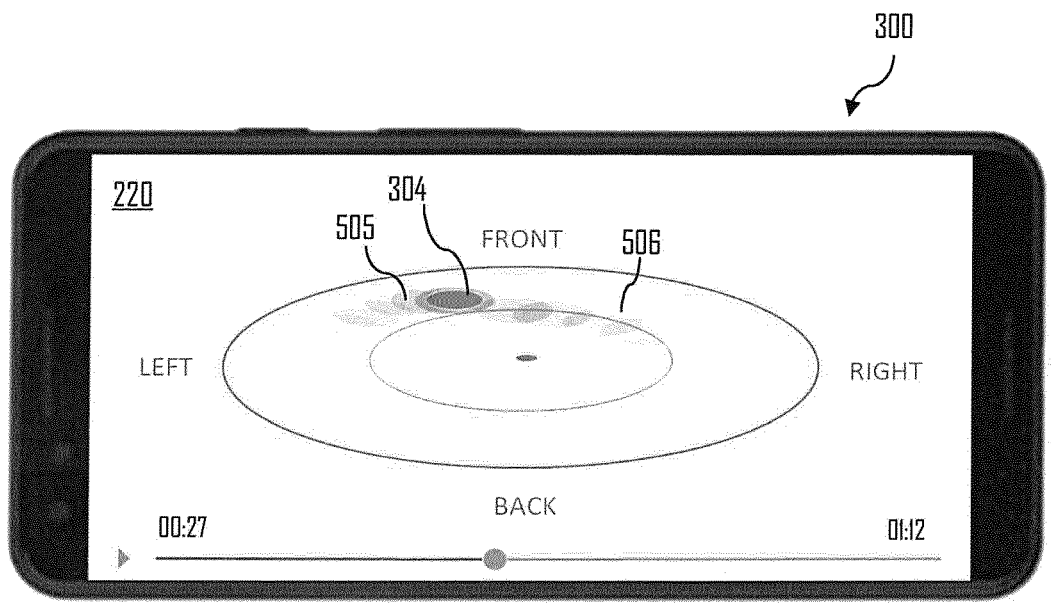
FIG. 5 shows an example movement of a control element on a user interface.

FIG. 5 illustrates movement of the control element 304 on the user interface 220 during playback of a captured content. In the example of FIG. 5, the position of the control element 304 at moment 00:27 is illustrated. In FIG. 5, the position of the control element 304 is not modified by the user, but the control element 304 moves according to characteristic parameter values in the spatial audio during playback. As illustrated in FIG. 5, during playback the control element 304 moves along the second path where new values appear and the earliest values on the first path have disappeared. The first path and the second path may be indicated by different colours and the colours may be updated as the control element 304 moves. Further, different symbols could be used instead of or in addition to colours. For example, a circle indicating a value on the second path and a diamond symbol indicating a value on the first path. As another example, the first path and the second path may be indicated by different types of haptic and/or tactile feedback. For example, the feedback patterns and/or intensities may be different for the first path and the second path.

Figure 6:
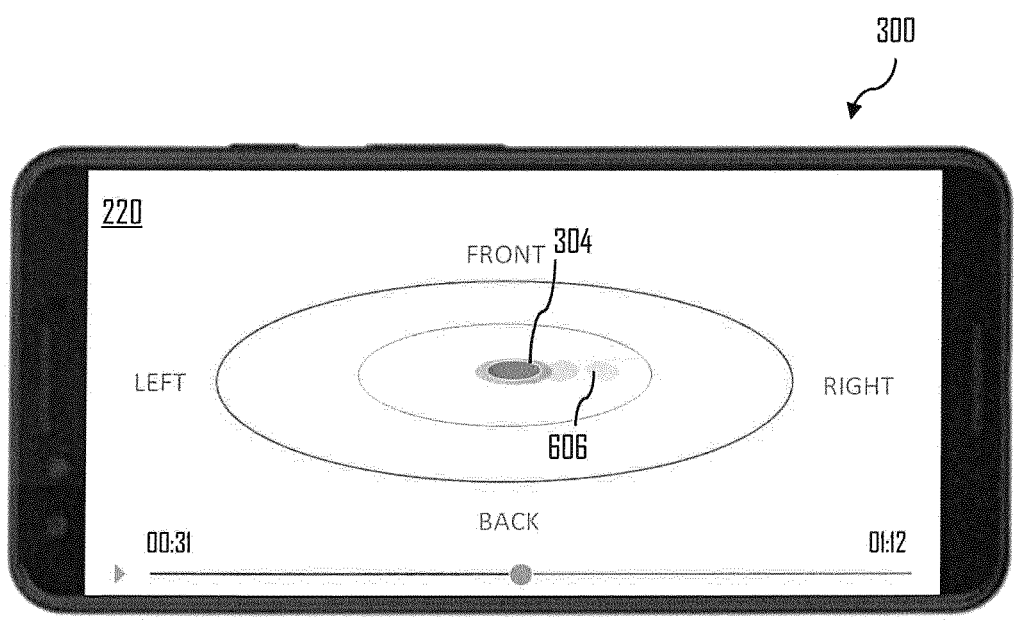
FIG. 6 shows an example position of a control element.

FIG. 6 illustrates a position of the control element 304 at moment 00:31. In the example of FIG. 6, a first path 606 is visible, but no second path is displayed. However, it can be assumed that there is still to come more positions of the control element 304 on the second path, because the appearance of the control element 304 has not been modified.

Figure 7:
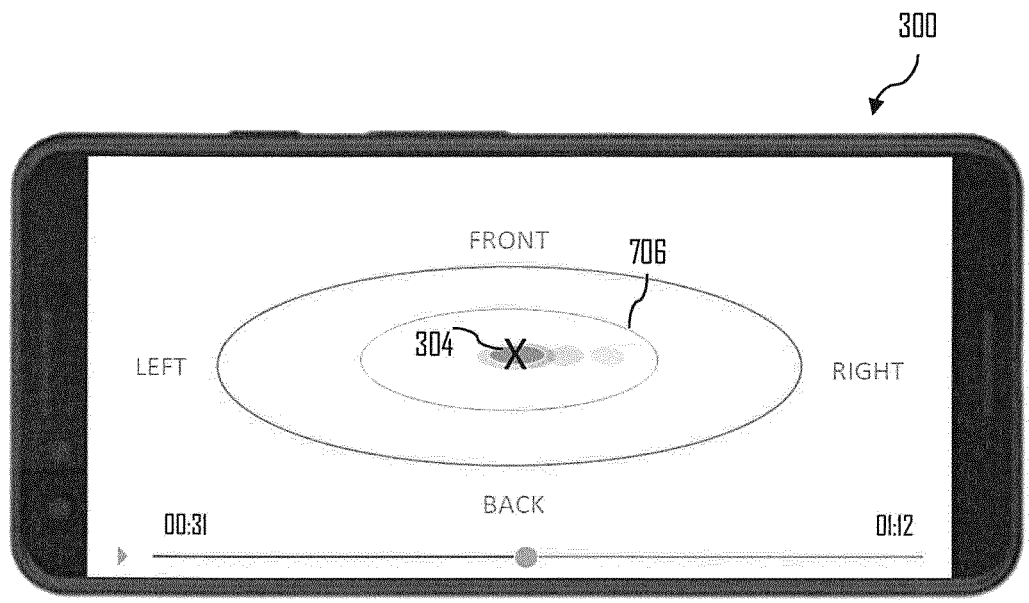
FIG. 7 shows another example position of a control element.

FIG. 7 illustrates a position of the control element 304 at moment 00:31. In the example of FIG. 7, a first path 706 is visible, but no second path is displayed. The appearance of the control element 304 is modified to indicate that there are no more positions of the control element 304 to come. The lack of future positions is illustrated with X on the control element 304. The appearance of the control element may also be modified such that different kind of haptic and/or tactile feedback is provided in response to a user touching the control element 304.

Figure 8:
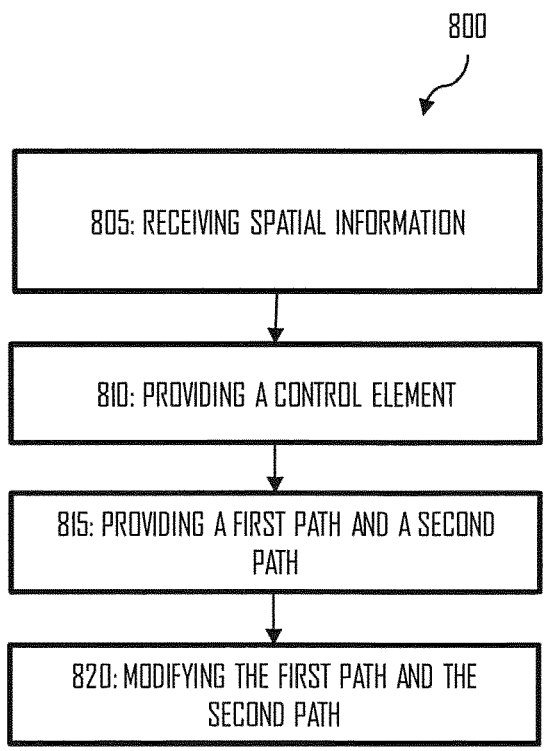
FIG. 8 illustrates an example method incorporating aspects of examples of the invention.

FIG. 8 illustrates an example method 800 incorporating aspects of the previously disclosed embodiments. More specifically the example method 800 illustrates modifying a first path of the control element and a second path of the control element.

The method starts with receiving 805 spatial information comprising at least one characteristic parameter. The at least one characteristic parameter may comprise an audio zoom parameter corresponding to an amount of audio gain with respect to a reference point and/or an audio focus parameter corresponding to a direction of audio with respect to a reference point.

The method continues with providing 810, on a user interface, a control element for controlling the at least one characteristic parameter in dependence upon a position of the control element on the user interface. The user interface may comprise a representation of a spatial audio field with respect to a reference point. A position of the control element on the user interface may correspond to a characteristic parameter value of the at least one characteristic parameter.

The method further continues with providing 815 on the user interface a first path of the control element and a second path of the control element. The first path of the control element may comprise one or more previous positions of the control element on the user interface. The second path of the control element may comprise one or more future positions of the control element on the user interface. The first path and the second path may be different paths or different portions of a path.

The method further continues with modifying 820 the first path of the control element and the second path of the control element according to predefined criteria in response to receiving a user input to change the position of the control element from a first position to a second position. Modifying the first path may comprise modifying at least one previous position of the control element on the first path. Modifying the second path may comprise modifying at least one future position of the control element on the second path.

Without in any way limiting the scope, interpretation, or application of the claims appearing below, a technical effect of one or more of the example embodiments disclosed herein is that a spatial audio recording may be modified such that sudden changes in characteristic parameter comprised by the spatial audio recording or playback may be reduced.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus comprising
at least one processor; and
at least one non-transitory memory including computer program code; the at least one memory and the computer program code configured to, with the at least one processor, cause the apparatus at least to perform:
   receive spatial audio information comprising at least one characteristic parameter, wherein the spatial audio information is comprised in a captured content;
   provide a control element for controlling the at least one characteristic parameter in dependence upon a position of the control element on a user interface at a time interval in the captured content, wherein the at least one characteristic parameter comprises at least one of:
      an audio focus parameter associated with focusing on a direction of audio, or
      an audio zoom parameter associated with applying an amount of audio gain;
   provide on the user interface a first path of the control element and a second path of the control element, wherein the first path represents one or more previous positions of the control element at one or more previous time intervals in the captured content and the second path represents one or more future positions of the control element at one or more future time intervals in the captured content; and
   modify at least one of the one or more previous positions represented with the first path of the control element and at least one of the one or more future positions represented with the second path of the control element according to predefined criteria in response to receiving a user input to change the position of the control element from a first position to a second position on the user interface.

2. The apparatus of claim 1, wherein the user interface comprises a representation of a spatial audio field with respect to a reference point.

3. The apparatus of claim 2, wherein the direction of audio comprises a direction with respect to the reference point.

4. The apparatus of claim 2, wherein the amount of audio gain comprises an amount of audio gain with respect to the reference point.

5. The apparatus of claim 1, wherein the position of the control element on the user interface corresponds to at least one characteristic parameter value of the at least one characteristic parameter.

6. The apparatus of claim 1, wherein the first path comprises the one or more previous positions of the control element on the user interface.

7. The apparatus of claim 1, wherein the second path comprises the one or more future positions of the control element on the user interface.

8. The apparatus of claim 1, wherein the at least one memory and the computer program code are further configured to, with the at least one processor, cause the apparatus to perform:
differentiate the first path from the second path.

9. The apparatus of claim 1, wherein the at least one memory and the computer program code are further configured to, with the at least one processor, cause the apparatus to perform:
modify presentation of the control element in dependence upon a future position of the control element comprised by the second path.

10. The apparatus of claim 1, wherein the predefined criteria comprises a distance between the first position and the second position of the control element.

11. The apparatus of claim 1, wherein the at least one memory and the computer program code are further configured to, with the at least one processor, cause the apparatus to perform:
modify the at least one characteristic parameter in response to changing the position of the control element on the user interface.

12. A method comprising:
receiving spatial audio information comprising at least one characteristic parameter, wherein the spatial audio information is comprised in a captured content;
providing a control element for controlling the at least one characteristic parameter in dependence upon a position of the control element on a user interface at a time interval in the captured content, wherein the at least one characteristic parameter comprises at least one of:
an audio focus parameter associated with focusing on a direction of audio, or
an audio zoom parameter associated with applying an amount of audio gain;
providing on the user interface a first path of the control element and a second path of the control element, wherein the first path represents one or more previous positions of the control element at one or more previous time intervals in the captured content and the second path represents one or more future positions of the control element at one or more future time intervals in the captured content; and
modifying at least one of the one or more previous positions represented with the first path of the control element and at least one of the one or more future positions represented with the second path of the control element according to predefined criteria in response to receiving a user input to change the position of the control element from a first position to a second position on the user interface.

13. The method of claim 12, wherein the user interface comprises a representation of a spatial audio field with respect to a reference point.

14. The method of claim 13, wherein the direction of audio comprises a direction with respect to the reference point.

15. The method of claim 13, wherein the amount of audio gain comprises an amount of audio gain with respect to the reference point.

16. The method of claim 12, wherein the position of the control element on the user interface corresponds to at least one characteristic parameter value of the at least one characteristic parameter.

17. The method of claim 12, wherein the first path comprises the one or more previous positions of the control element on the user interface and the second path comprises the one or more future positions of the control element on the user interface.

18. A non-transitory computer readable medium comprising program instructions for causing an apparatus to perform at least the following:
receiving spatial audio information comprising at least one characteristic parameter, wherein the spatial audio information is comprised in a captured content;
providing a control element for controlling the at least one characteristic parameter in dependence upon a position of the control element on a user interface at a time interval in the captured content, wherein the at least one characteristic parameter comprises at least one of:
an audio focus parameter associated with focusing on a direction of audio, or
an audio zoom parameter associated with applying an amount of audio gain;
providing on the user interface a first path of the control element and a second path of the control element, wherein the first path represents one or more previous positions of the control element at one or more previous time intervals in the captured content and the second path represents one or more future positions of the control element at one or more future time intervals in the captured content; and
modifying at least one of the one or more previous positions represented with the first path of the control element and at least one of the one or more future positions represented with the second path of the control element according to predefined criteria in response to receiving a user input to change the position of the control element from a first position to a second position on the user interface.

19. The non-transitory computer readable medium of claim 18, wherein the user interface comprises a representation of a spatial audio field with respect to a reference point.

20. The non-transitory computer readable medium of claim 18, wherein the position of the control element on the user interface corresponds to at least one characteristic parameter value of the at least one characteristic parameter.

* * * * *